United States Patent
Peterson et al.

(10) Patent No.: US 10,399,417 B2
(45) Date of Patent: Sep. 3, 2019

(54) TWO PIECE ROOF AND MOUNTING FOR SXS VEHICLE

(71) Applicant: HONDA MOTOR CO., LTD., Tokyo (JP)

(72) Inventors: Michael V. Peterson, Marysville, OH (US); Joseph H. Korte, Marysville, OH (US); Jacob O. Borth, Kansas City, KS (US); Robert T. Wilson, III, Delaware, OH (US); Mustafa Soncag, Columbus, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/845,648

(22) Filed: Dec. 18, 2017

(65) Prior Publication Data

US 2019/0184801 A1    Jun. 20, 2019

(51) Int. Cl.
| | |
|---|---|
| *B60J 7/11* | (2006.01) |
| *B60J 7/00* | (2006.01) |
| *B60R 21/13* | (2006.01) |
| *B60J 7/19* | (2006.01) |
| *B62D 65/06* | (2006.01) |

(52) U.S. Cl.
CPC ............ *B60J 7/11* (2013.01); *B60J 7/0084* (2013.01); *B60J 7/196* (2013.01); *B60R 21/13* (2013.01); *B62D 65/06* (2013.01); *B60Y 2200/20* (2013.01); *B60Y 2410/122* (2013.01)

(58) Field of Classification Search
CPC .. B60J 7/11; B60J 7/196; B62D 25/06; B62D 25/07

USPC .............. 296/218, 216.01–224, 213, 222, 296/216.04–216.05
See application file for complete search history.

(56) References Cited

U.S. PATENT DOCUMENTS

| | | | | |
|---|---|---|---|---|
| 2,550,323 | A | * 4/1951 | Bishop | B60J 7/003 296/214 |
| 2,661,234 | A | * 12/1953 | Bishop | B60J 7/192 296/213 |
| 5,725,273 | A | 3/1998 | Vernon et al. | |
| 5,961,177 | A | * 10/1999 | Caye | B60J 7/0038 296/213 |
| 6,059,356 | A | 5/2000 | Hoelzel et al. | |
| 6,189,962 | B1 | 2/2001 | Henderson | |
| 6,468,149 | B2 | 10/2002 | Essig et al. | |

(Continued)

FOREIGN PATENT DOCUMENTS

| | | | |
|---|---|---|---|
| DE | 4443525 | * | 2/1996 |
| DE | 10214862 A1 | | 10/2003 |

*Primary Examiner* — Dennis H Pedder
(74) *Attorney, Agent, or Firm* — Arent Fox LLP

(57) ABSTRACT

The disclosure provides a roofing system suitable for off-road vehicles. The roofing system includes a front panel that connects to a front, first lateral member of a roll cage of the vehicle and extends rearward over a front passenger seat to a rearward, second lateral member of the roll cage. The roofing system includes a rear panel that overlaps and connects to the front panel at a lateral seam including a channel and a seal between the front panel and the rear panel. The same front panel may be used on multiple models of vehicle. The rear panel may be sized according to the model of the vehicle. When different rear panels are used, each rear panel may include the same features along a front edge for forming a seam with the common front panel.

19 Claims, 11 Drawing Sheets

(56) References Cited

U.S. PATENT DOCUMENTS

| | | | |
|---|---|---|---|
| 7,249,798 B2 * | 7/2007 | Saito | B60N 2/24 280/756 |
| 7,523,977 B2 | 4/2009 | Fallis, III et al. | |
| 8,757,662 B2 | 6/2014 | Deschambault | |
| 8,991,896 B1 * | 3/2015 | Whitehead | B60J 7/106 296/121 |

* cited by examiner

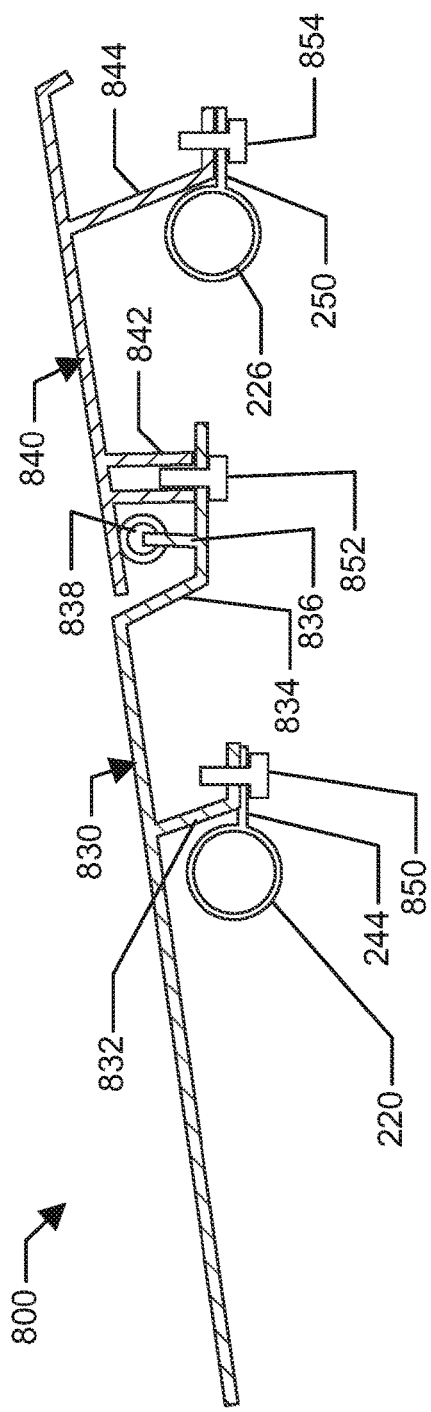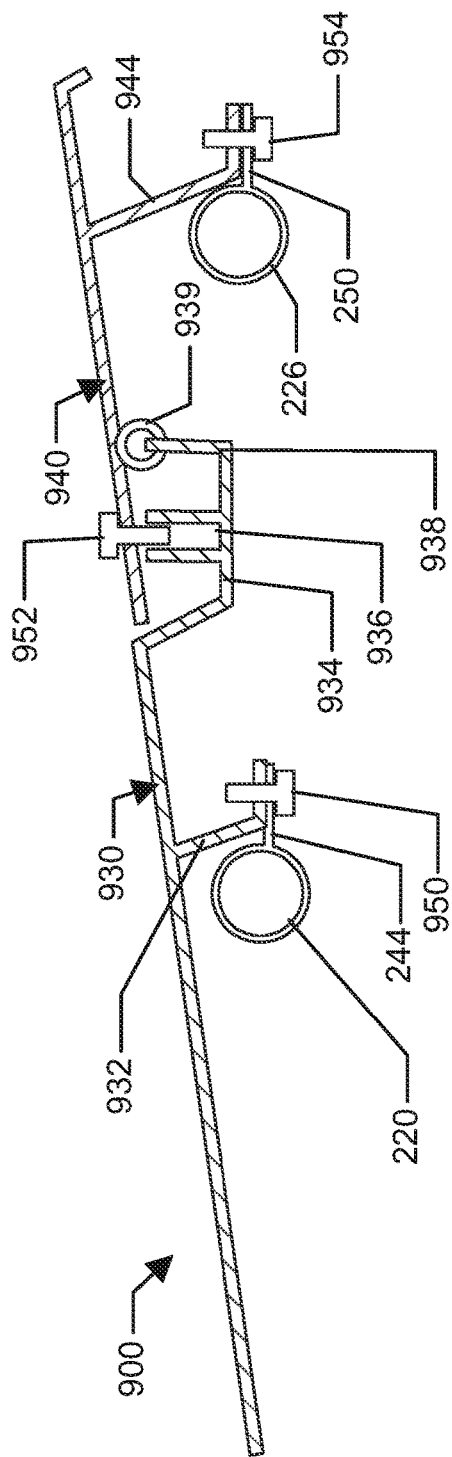

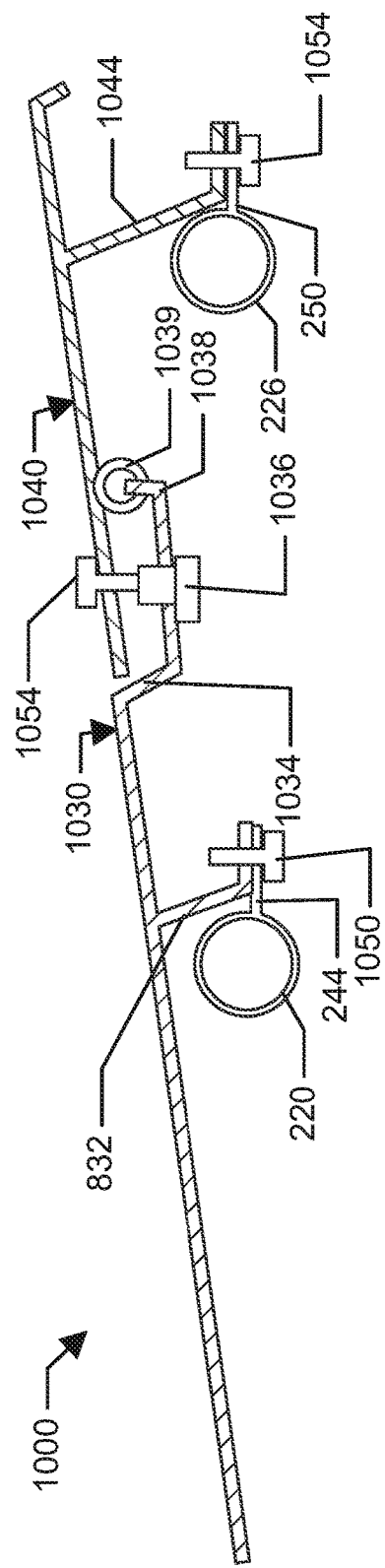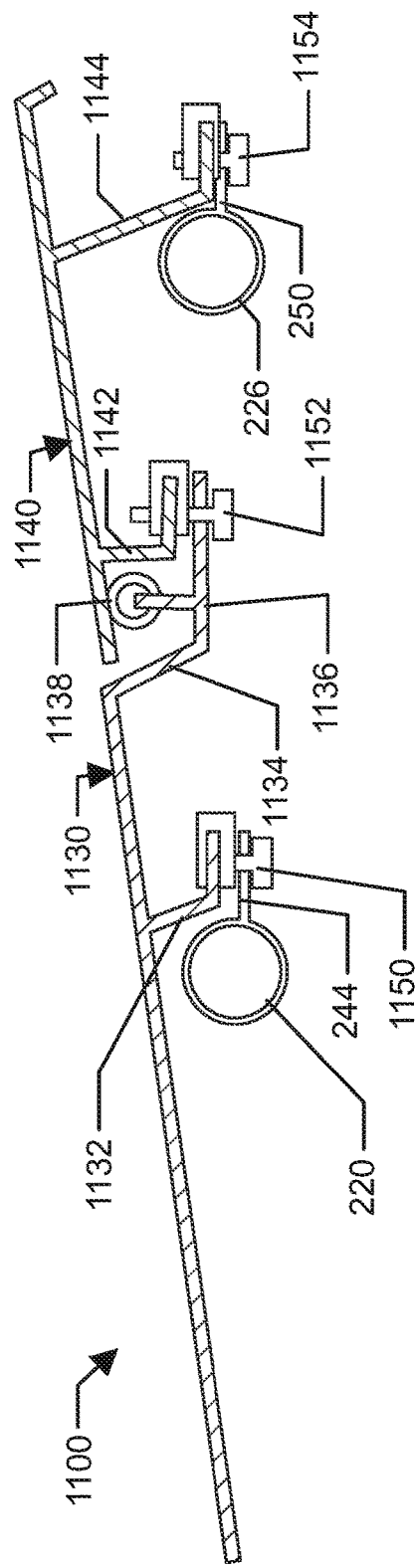

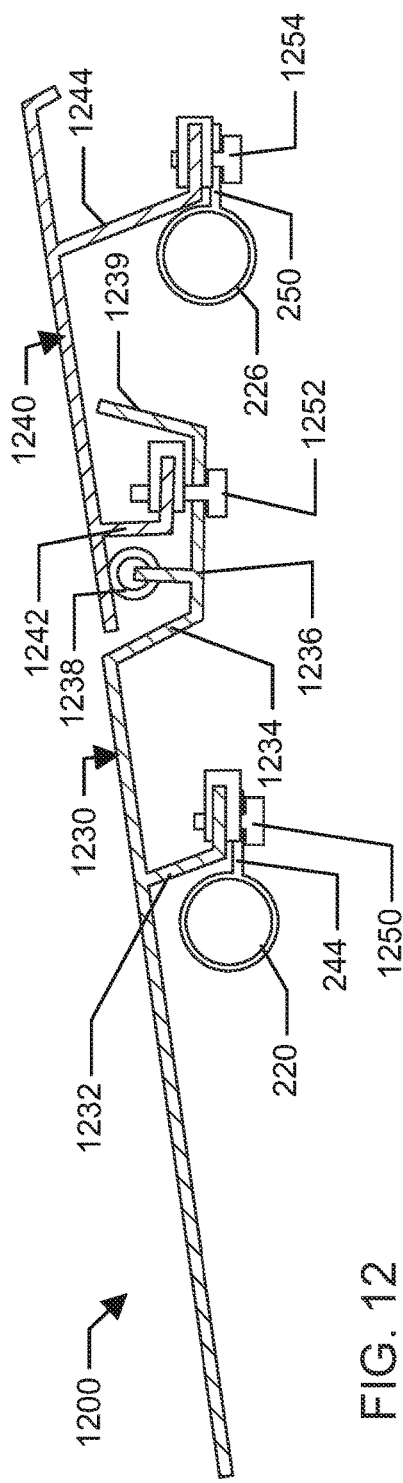
FIG. 12
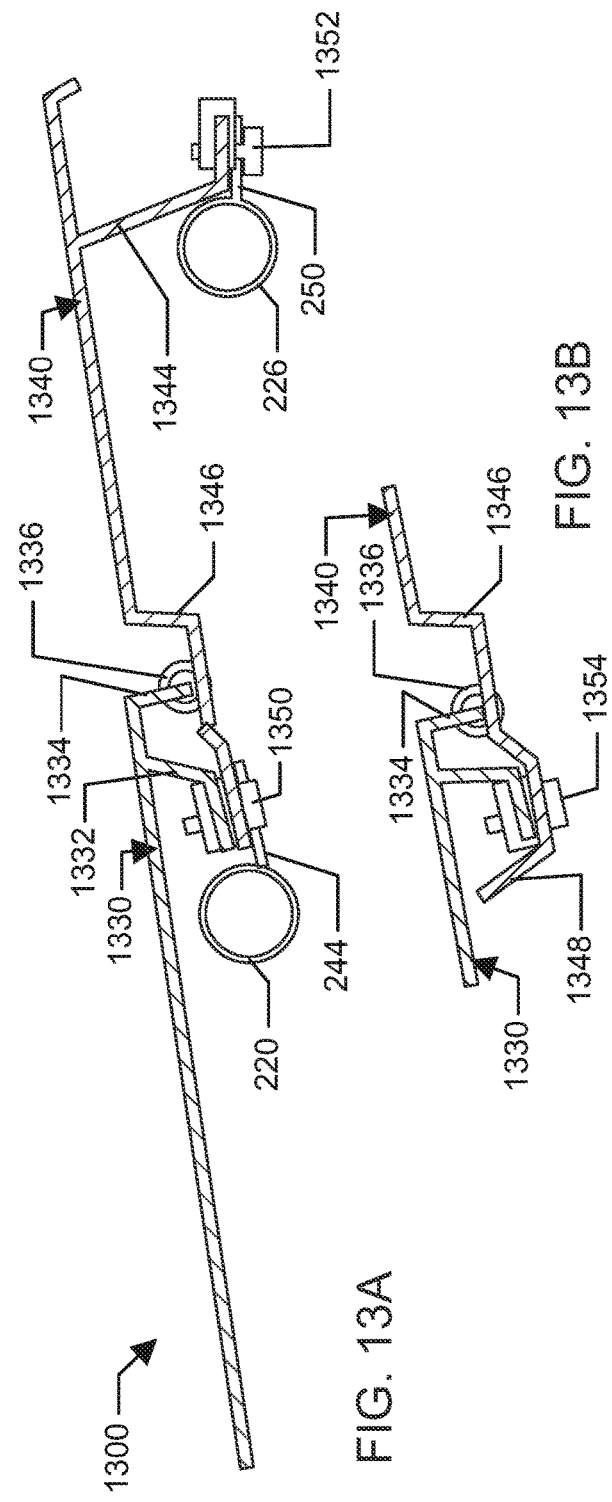
FIG. 13A
FIG. 13B

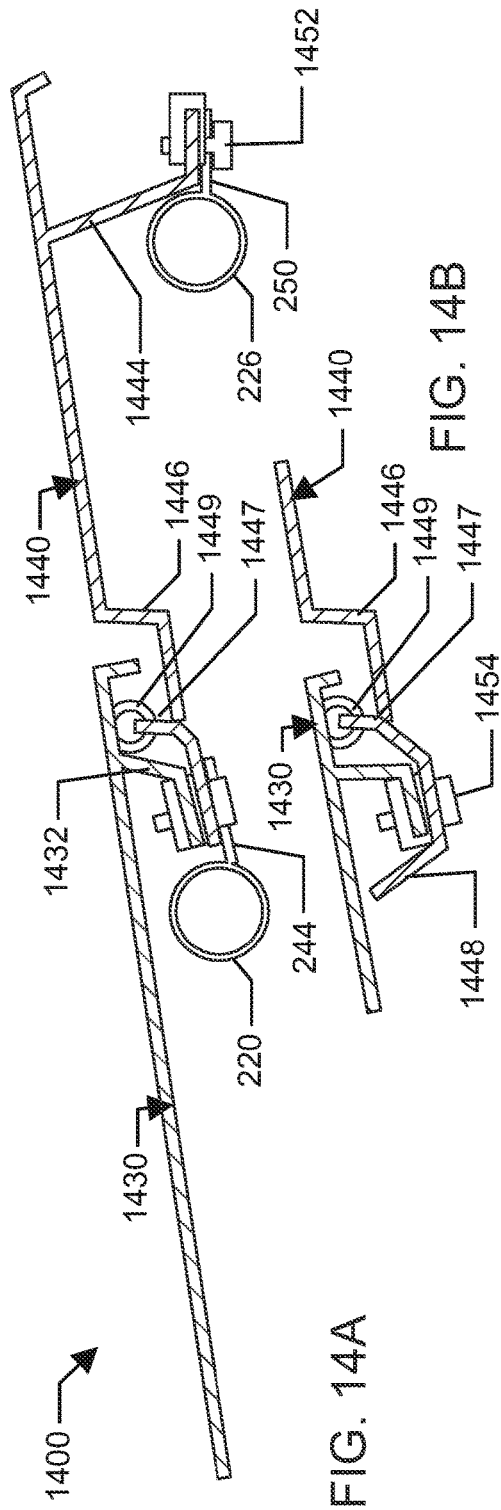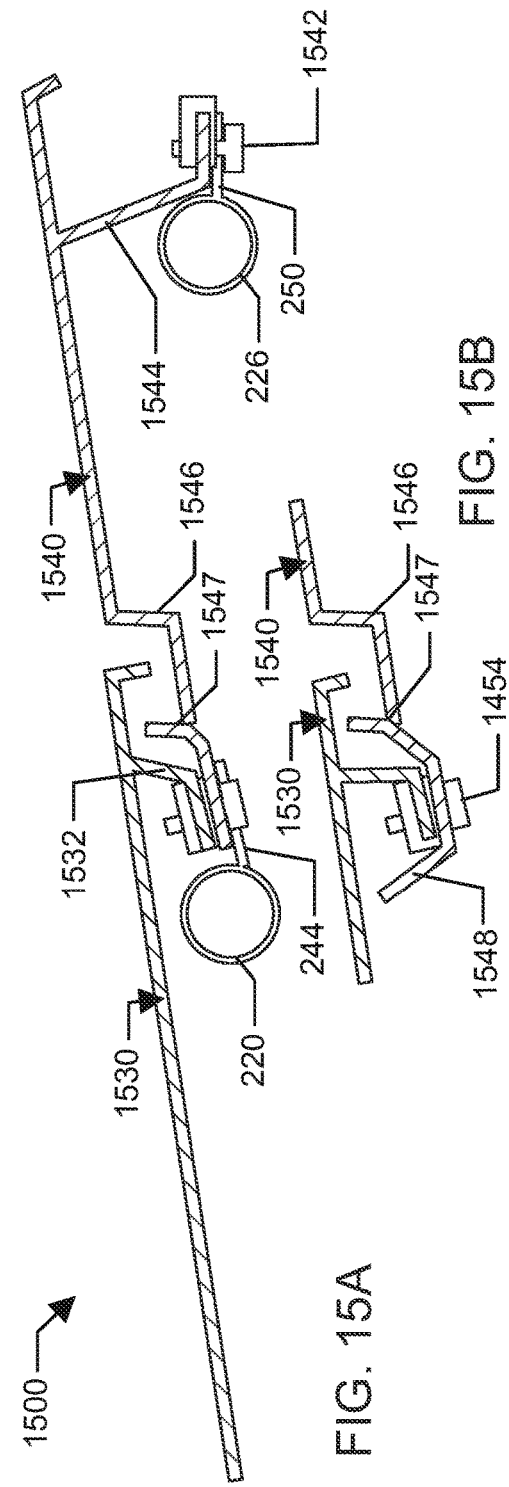

TWO PIECE ROOF AND MOUNTING FOR SXS VEHICLE

TECHNICAL FIELD

Aspects of the present disclosure relate to devices and methods of manufacture thereof in automotive assembly, and in particular to devices and methods of manufacture thereof for roofs that mount to a roll cage of a vehicle.

BACKGROUND

A side-by-side (SXS) vehicle typically includes a roll cage that provides stability to the vehicle and protection to the driver and passenger(s). In some cases, a roof that mounts to the roll cage may be added to a SXS vehicle by the manufacturer or as an after-market part. Conventionally, such roofs for SXS vehicles are manufactured using thermoformed plastics. Such manufacturing techniques limit the features and level of detail that can be included in the roof structure.

Injection molding is another technique that is known for forming plastic parts. In the case of a SXS vehicle, however, a roof structure is typically too large to be formed using standard injection molding machinery. Although larger machinery may be available, such machinery may be expensive.

In view of the foregoing, there is a need for improved roofs for SXS vehicles and techniques for manufacturing such roofs. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a roofing system suitable for off-road vehicles, for example. The roofing system includes a front panel that connects to a front, first lateral member of a roll cage of the off-road vehicle and extends rearward over a front passenger seat to a rearward, second lateral member of the roll cage. The roofing system includes a rear panel that overlaps and connects to the front panel at a lateral seam including a channel and a seal between the front panel and the rear panel.

In another aspect, the disclosure provides a method of manufacturing roofs suitable for off road vehicles, for example. The method may include forming a first front panel in an injection molding press using a first mold. The method may include forming a first rear panel in an injection molding press using a second mold. The method may include mounting the first front panel to a roll cage of a first vehicle. The method may include mounting the first rear panel to the roll cage of the first vehicle and to the first front panel, wherein the first rear panel overlaps and connects to the first front panel at a lateral joint including a channel and a seal between the first front panel and the first rear panel.

In another aspect, the disclosure provides a vehicle. The vehicle may include a seating area including at least two seats. The vehicle may include a roll cage extending over the at least two seats. The vehicle may include a front panel that connects to a first front lateral member of the roll cage and extends rearward over the at least two seats to a second lateral member of the roll cage. The vehicle may include a rear panel that overlaps and connects to the front panel at a lateral seam including a channel and a seal between the front panel and the rear panel.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

FIG. 8 is a cross-sectional view of a fifth example seam along a longitudinal center line, according to an aspect of the disclosure.

FIG. 9 is a cross-sectional view of a sixth example seam along a longitudinal center line, according to an aspect of the disclosure.

FIG. 10 is a cross-sectional view of a seventh example seam along a longitudinal center line, according to an aspect of the disclosure.

FIG. 11 is a cross-sectional view of a eighth example seam along a longitudinal center line, according to an aspect of the disclosure.

FIG. 12 is a cross-sectional view of a ninth example seam along a longitudinal center line, according to an aspect of the disclosure.

FIG. 13A is a cross-sectional view of a tenth example seam along a longitudinal center line, according to an aspect of the disclosure.

FIG. 13B is a cross-sectional view of the tenth example seam of FIG. 13A along a longitudinal line through a middle region.

FIG. 14A is a cross-sectional view of a tenth example seam along a longitudinal center line, according to an aspect of the disclosure.

FIG. 14B is a cross-sectional view of the tenth example seam of FIG. 14A along a longitudinal line through a middle region.

FIG. 15A is a cross-sectional view of a tenth example seam along a longitudinal center line, according to an aspect of the disclosure.

FIG. 15B is a cross-sectional view of the tenth example seam of FIG. 15A along a longitudinal line through a middle region.

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle roof structure disclosed herein are merely terms of art that may vary from one manufacturer to another and should not be deemed to limit the present disclosure.

Generally described, the present disclosure provides for a vehicle roof suitable for an off-road vehicle, for example, including a front panel and a rear panel joined at a lateral seam. The front panel may connect to a front, first lateral member of a roll cage of the off-road vehicle and may extend rearward over a front passenger seat to a second lateral member of the roll cage. The rear panel may connect to the front panel at the lateral seam including a channel and a seal between the front panel and the rear panel.

The use of a roofing system including two parts may allow each of the parts to be manufactured using a standard sized injection molding press (e.g., a 4000-ton machine). Further, the front part may be common to multiple models of vehicle, while the rear part may be unique for each model of vehicle (e.g., a two-seat model and a four-seat model). Accordingly, manufacturing efficiency may be gained by producing the front part using the same mold for all models of the vehicle. The vehicle roof may be mounted to the off-road vehicle using removable fasteners. In some aspects, one or both of the front panel and rear panel may be used separately, allowing a user to customize the appearance and functionality of the roof.

Figure 1:
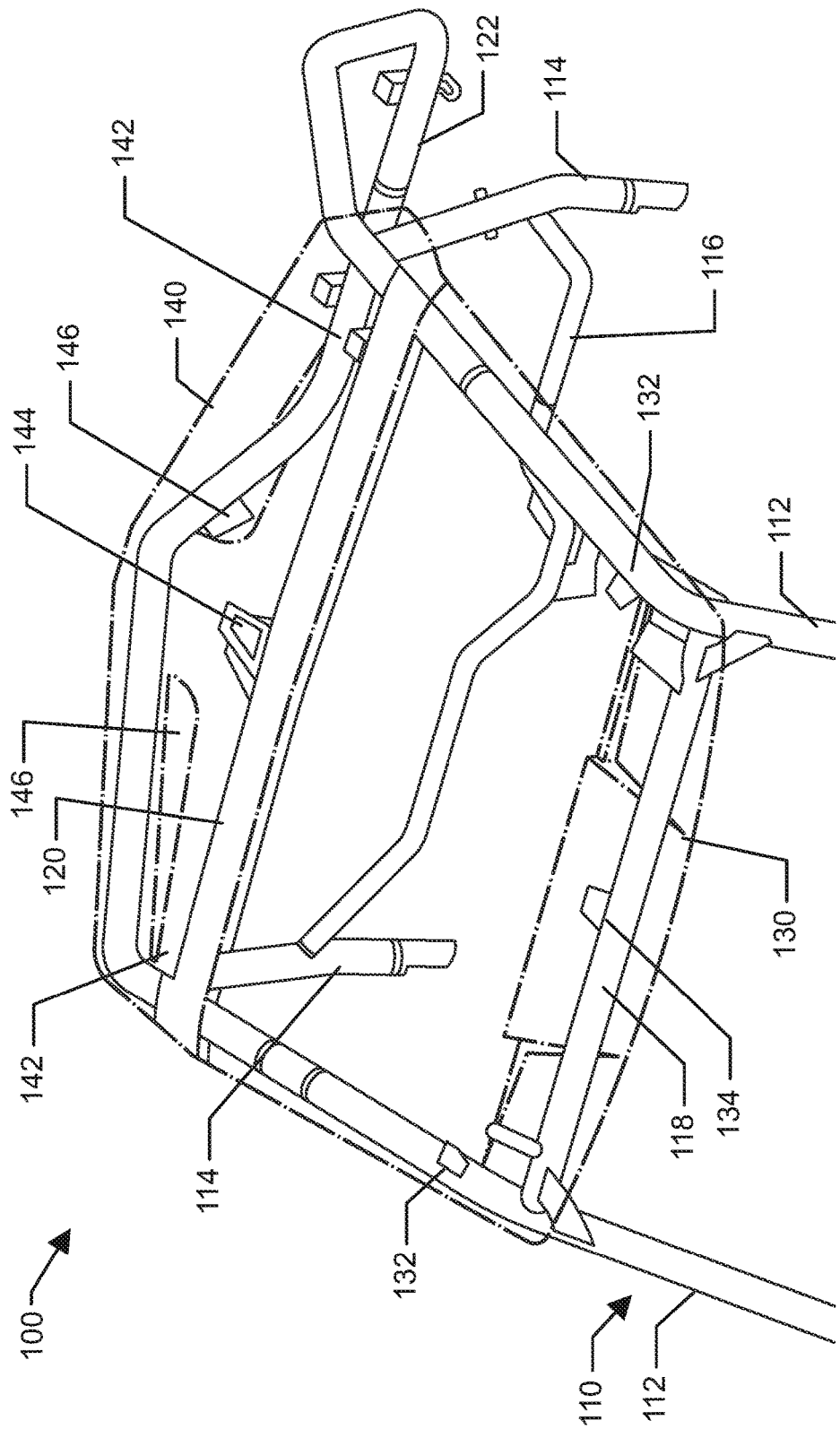
FIG. 1 is a perspective view of a roofing system for a two-seat SXS vehicle, according to an aspect of the disclosure.

Turning to the figures, where like reference numbers refer to like components, FIG. 1 illustrates an example vehicle roof structure 100. The vehicle roof structure 100 may include a roll cage 110, a front panel 130, and a rear panel 140. The vehicle roof structure 100 may be used for a two-seat SXS vehicle. The front panel 130 may be relatively larger than the rear panel 140. The front panel 130 may cover the majority of a passenger area. The rear panel 140 may be relatively smaller than the front panel 130. The rear panel may extend behind the passenger area.

The roll cage 110 may be integrated into the frame of a vehicle such as a SXS vehicle. The roll cage 110 may include longitudinal members 112 on each side of the vehicle that extend longitudinally from a front of a passenger area to a rear lateral member 122 located behind the passenger area. The longitudinal members 112 may be formed by structural tubing, e.g., pipes. Each longitudinal member 112 may be bent to arc over the passenger area. The roll cage 110 may include lateral members connecting the longitudinal members. For example, the roll cage 110 may include a front lateral member 118, a second lateral member 120, and the rear lateral member 122. Each lateral member may be formed from structural tubing and welded to the longitudinal members 112. The roll cage 110 may also include vertical members 114 that extend upward from the frame of the vehicle on each side and connect to the respective longitudinal member 112. The vertical members 114 may be connected via a lower lateral member 116. The lower lateral member 116 may be bent such that a center is lower and includes another mounting location to the vehicle frame. The lateral member 116 may be located behind a passenger seat and define the rear end of the passenger area. A windshield (not shown) may be mounted to the longitudinal members 112 and the front lateral member 118 and define the front end of the passenger area.

The front panel 130 may cover at least a front portion of the passenger area. For example, the front panel 130 may cover an area above the front seats in the passenger area. The front panel 130 may be mounted to the roll cage 110 at a front center mount 134 and at front side mounts 132. The front center mount 134 may be located on the front lateral member 118. The front side mounts 132 may be located on the longitudinal members 112 slightly behind the front lateral member 118, for example, at a location after the bend in the longitudinal member 112.

The rear panel 140 may cover an area behind the passenger seats. The rear panel 140 may have a generally triangular shape at a rear end. That is, the rear panel 140 may extend furthest rearward along a longitudinal center line. The rear panel 140 may include openings 146 to each side of the longitudinal center line. The openings 146 may have a shape that directs rain and/or dust downward. In an aspect, the rear panel 140 may be mounted via rear side mounts 142 and a rear center mount 144. The side mounts 142 may be located on the second lateral member 120 near the longitudinal members 112. The rear center mount 144 may be located on the second lateral member 120 on the longitudinal center line.

The front panel 130 may also be mounted to the roll cage 110 via rear side mounts 142 and rear center mount 144. As will be discussed in further detail below, the front panel 130 may overlap the rear panel 140. The overlapping panels may form a lateral seam near the second lateral member 120. The rear side mounts 142 and/or rear center mount 144 may form a portion of the seam. The seam may prevent water from entering between the front panel 130 and the rear panel 140. The seam may channel water toward the sides of the roof structure 100.

Figure 2:
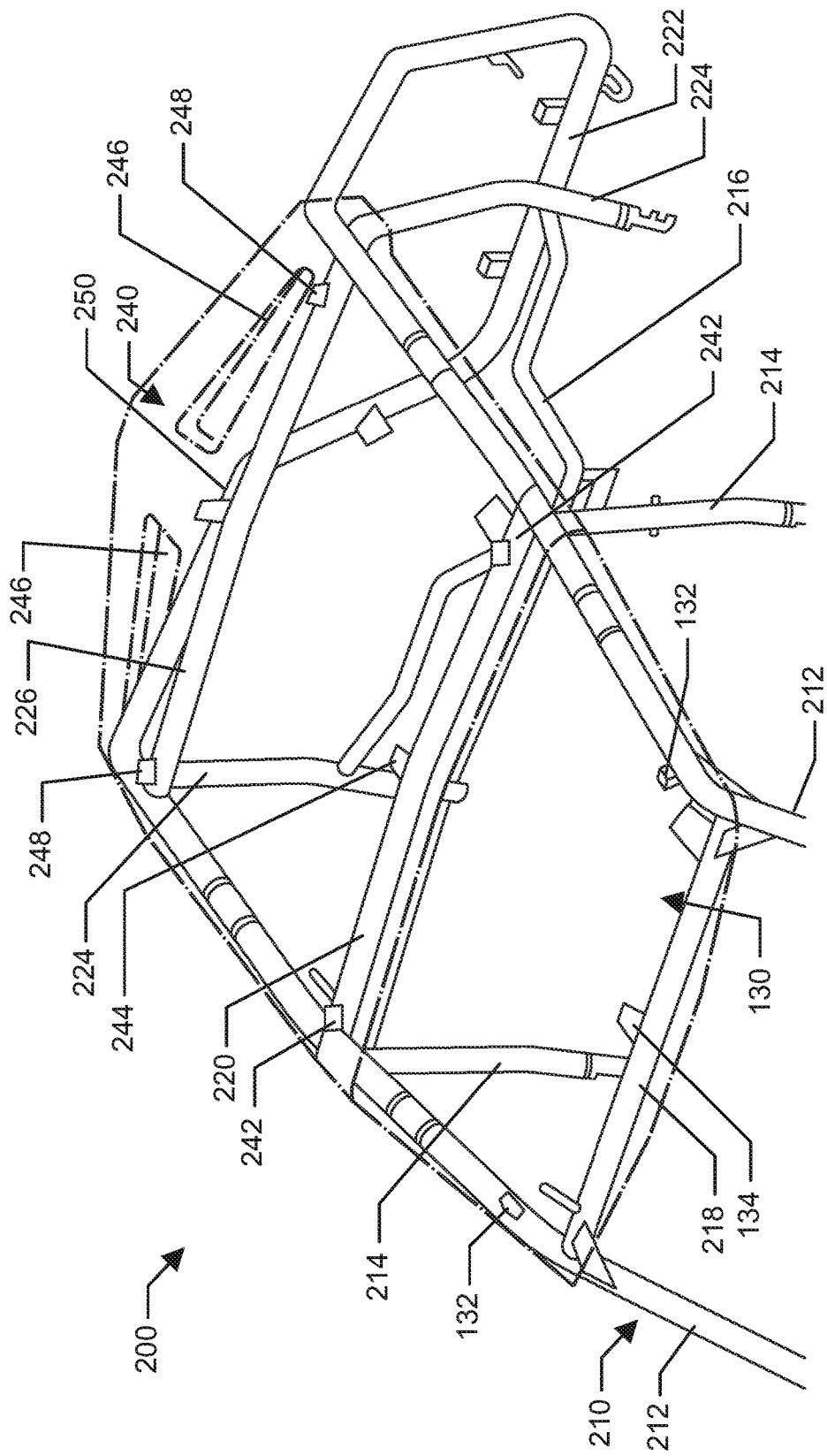
FIG. 2 is a perspective view of a roofing system for a four-seat SXS vehicle, according to an aspect of the disclosure.

Turning FIG. 2, an example vehicle roof structure 200 may include a roll cage 210, the front panel 130, and a rear panel 240. The vehicle roof structure 100 may be used for a four-seat SXS vehicle. The front panel 130 may be the same as the front panel 130 shown in FIG. 1. That is, the same front panel 130 may be used with either the two-seat model or the four-seat model of a SXS vehicle. The front panel 130 may be approximately the same size as the rear panel 240, or slightly smaller depending on the size of the rear seats and roll cage 210. The front panel 130 may cover the front seats of a passenger area. The rear panel 140 may cover the rear seats of the passenger area and extend behind the passenger area.

The roll cage 210 may be integrated into the frame of a vehicle such as a SXS vehicle. The roll cage 210 may include longitudinal members 212 on each side of the vehicle that extend longitudinally from a front of a passenger area to a rear lateral member 222 located behind the passenger area. The longitudinal members 112 may be formed by structural tubing, e.g., pipes. Each longitudinal member 212 may be bent to arc over the passenger area. The roll cage 210 may include lateral members connecting the longitudinal members. For example, the roll cage 210 may include a front lateral member 218, a second lateral member 220, a third lateral member 226, and the rear lateral member 222. Each lateral member may be formed from structural tubing and welded to the longitudinal members 212. The roll cage 110 may also include vertical members 214, 224 that extend upward from the frame of the vehicle on each side and connect to the respective longitudinal member 212. The first vertical members 214 may connect to the respective longitudinal members 212 near the second lateral member 220. The second vertical members 224 may connect to the respective longitudinal member 212 near the third lateral member 226. The vertical members 224 may be connected via a lower lateral member 216. The lower lateral member 216 may be located behind a passenger seat and define the rear end of the passenger area. The lower lateral member 216 may be bent such that a center is lower and includes another mounting location to the vehicle frame. A windshield (not shown) may be mounted to the longitudinal members 212 and the front lateral member 218 and define the front end of the passenger area.

The front panel 130 may cover at least a front portion of the passenger area. For example, the front panel 130 may cover an area above the front seats in the passenger area. The front panel 130 may be mounted to the roll cage 210 at a front center mount 234 and at front side mounts 232. The front center mount 234 may be located on the front lateral member 218. The front side mounts 232 may be located on the longitudinal members 212 slightly behind the front lateral member 218, for example, at a location after the bend in the longitudinal member 212.

The rear panel 240 may cover the rear passenger seats and extend rearward of the passenger area. The rear panel 240 may have a generally triangular shape at a rear end. That is, the rear panel 240 may extend furthest rearward along a longitudinal center line. The rear panel 240 may include openings 246 to each side of the longitudinal center line. The openings 246 may have a shape that directs rain and/or dust downward. In an aspect, the rear panel 240 may be mounted via middle side mounts 242, a middle center mount 244, rear side mounts 248, and a rear center mount 250. The middle side mounts 242 may be located on the second lateral member 220 near the longitudinal members 212. The middle center mount 244 may be located on the second lateral member 220 on the longitudinal center line. The rear side mounts 248 may be located on the third lateral member 226 near the longitudinal members 212. The rear center mount 250 may be located on the third lateral member 226 on the longitudinal center line.

The front panel 130 may also be mounted to the roll cage 210 via middle side mounts 242 and middle center mount 244. As will be discussed in further detail below, the front panel 130 may overlap the rear panel 240. The overlapping panels may form a seam near the second lateral member 120. The middle side mounts 242 and/or middle center mount 244 may form a portion of the seam. A front edge of the rear panel 240 may be configured in a similar manner as the front edge of the rear panel 140 such that the rear panels may be used interchangeably with the front panel 130.

Figure 3:
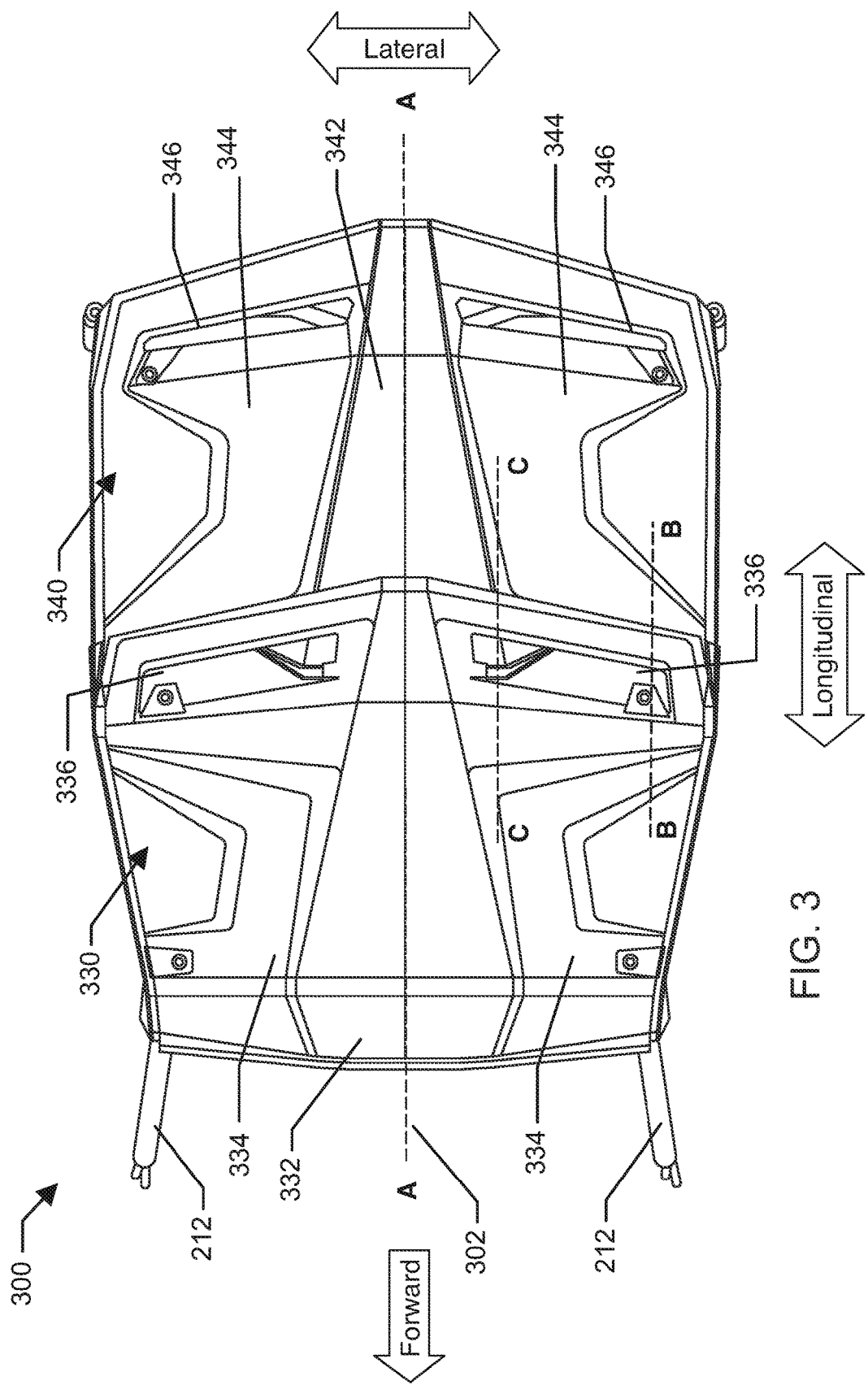
FIG. 3 is a top view of another example vehicle roof structure for a four-seat SXS vehicle, according to an aspect of the disclosure.

FIG. 3 is a top view of another example vehicle roof structure 300. The vehicle roof structure 300 may be used for a four-seat model SXS vehicle having longitudinal members 212. A front panel 330 may be mounted over the front passenger seats and a rear panel 340 may be mounted over the rear passenger seats. The front panel 330 and the rear panel 340 may include similar structural features. For example, the front panel 330 may include a raised central area 332, and the rear panel 340 may include a raised central area 342. The front panel 330 may include side channel portions 334 that direct water to the sides of the roof structure 300, and the rear panel 340 may include side channel portions 344 that direct water toward openings 346. The front panel 336 may also include openings 336 that allow water to flow from the front panel 336 into the side channel portions 344.

The below discussion of options for mounting roof panels to a roll cage and forming a lateral seam will refer to various cross-sections of a roof structure. A center longitudinal line A-A 302 extends the length of the roof structure 300 along a longitudinal center line and passes through the front center mount 134, middle center mount 244, and rear center mount 250. A side longitudinal line B-B extends though the side middle mount 242. An offset longitudinal line C-C does not extend though any mount, but may include a fastener to connect the front panel 330 and rear panel 340.

Figure 4A:
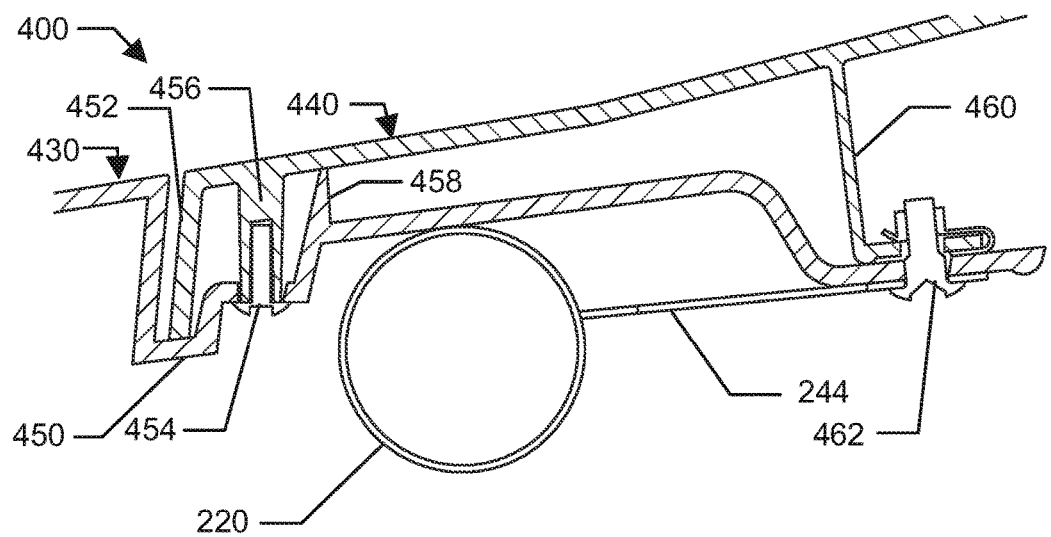
FIG. 4A is a cross-sectional view of a first example seam along a longitudinal center line, according to an aspect of the disclosure.

FIG. 4A is a cross-sectional view along line A-A in a first example seam 400. The seam 400 may include a channel 450 in the front panel 430 located forward of the lateral member 220. A flange 452 of the rear panel may fit into the channel 450. The rear panel 440 may also include a boss 456 that receives a fastener (e.g., taper screw) 454 to fasten the front panel 430 to the rear panel. Either the front panel 430 or the rear panel 440 may include a wiper seal 458 extending toward the other panel rearward of the boss 456. The rear panel 440 may also include a spacer flange 460 extending downward from a main portion of the rear panel 440. A spacer flange may refer to any extending structure that spaces a connection away from a main portion of the panel, typically in a location underneath the panel. The spacer flange 460 may abut a top surface of the front panel 430. A fastener 462 (e.g., a clip nut and screw) may fasten together the middle center mount 244, front panel 430, and spacer flange 460 rearward of the lateral member 220.

Figure 4B:
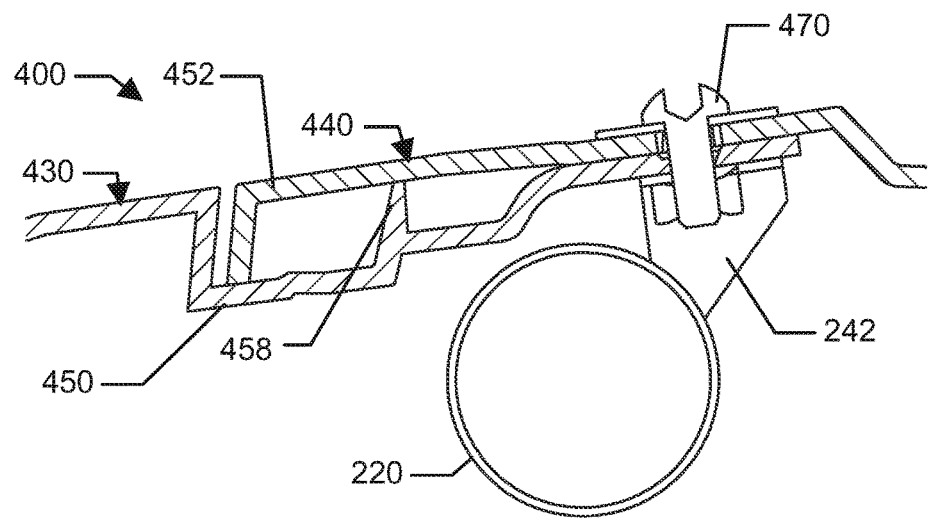
FIG. 4B is a cross-sectional view of the first example seam of FIG. 4A along a longitudinal line through a side mounting location.

FIG. 4B is a cross-sectional view along line B-B in the first example seam 400. The channel 450, flange 452, and wiper seal 458 may extend laterally along the width of the seam 400 and may vary in shape. Rearward of the lateral member 220, the front panel 430 and rear panel 440 may be in surface contact and fastened to the side middle mount 242 with a fastener 470 (e.g., a collar and screw).

Figure 5:
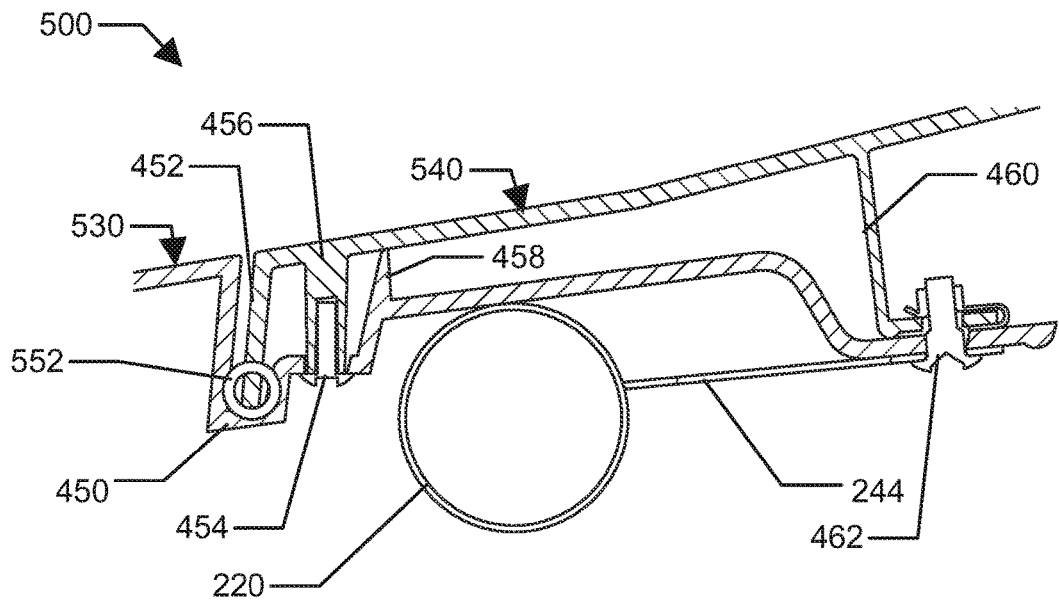
FIG. 5 is a cross-sectional view of a second example seam along a longitudinal center line, according to an aspect of the disclosure.

FIG. 5 is a cross-sectional view along line A-A in a second example seam 500. The example seam 500 may be similar to the example seam 400, but include a bulb seal 502 at the end of the flange 452. The bulb seal 502 may fill the channel 450.

Figure 6:
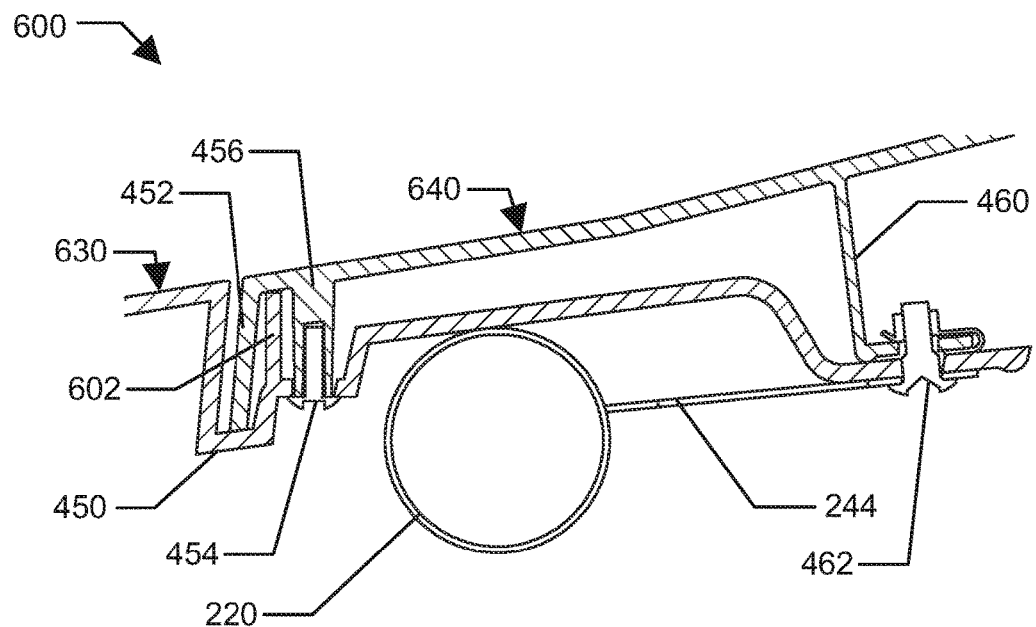
FIG. 6 is a cross-sectional view of a third example seam along a longitudinal center line, according to an aspect of the disclosure.

FIG. 6 is a cross-sectional view along line A-A in a third example seam 600. The example seam 600 may be similar to the example seam 400, but include a wiper seal 602 extending upward from the channel 450 to the rear panel 640 between the flange 452 and the boss 456. The wiper seal 458 may not be needed rearward of the boss 456.

Figure 7A:
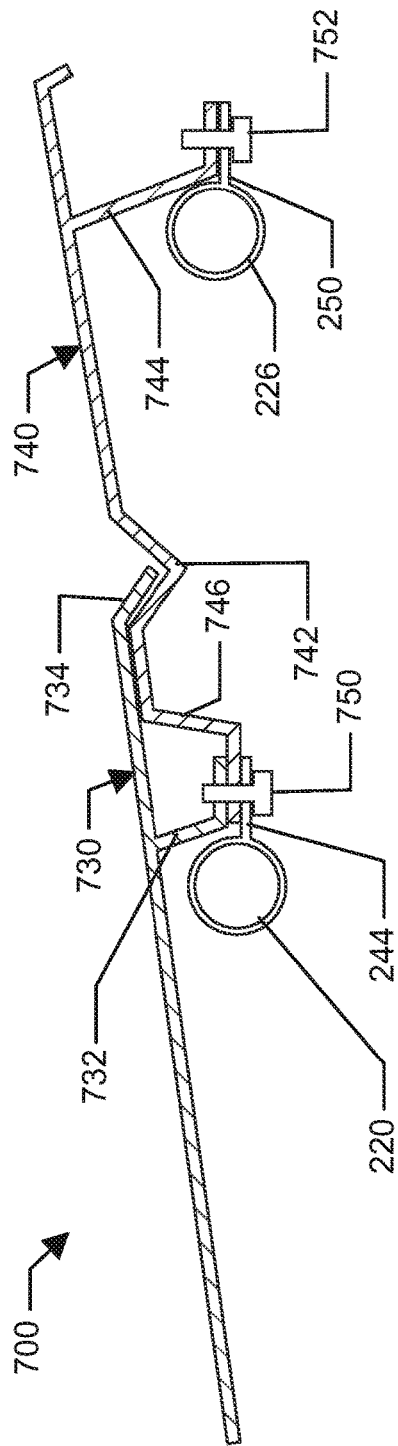
FIG. 7A is a cross-sectional view of a fourth example seam along a longitudinal center line, according to an aspect of the disclosure.

FIG. 7A is a cross-sectional view along line A-A in a fourth example seam 700. The seam 700 may include a spacer flange 732 extending downward from the front panel 730 and a spacer flange 746 extending downward from the rear panel 740. The spacer flange 732 and the spacer flange 746 may be fastened to the middle center mount 244 with a fastener 750 (e.g., clip nut and screw). The rear panel 740 may include a channel 742 rearward of the middle center mount 244 and the front panel 730 may have a corresponding wiper seal 734 at a rearward edge of the front panel 730. The rear panel 740 may also include a rear spacer flange 744 extending downward. The rear spacer flange 744 may be fastened to the rear center mount 250 via a fastener 752 (e.g., clip nut and screw).

Figure 7B:
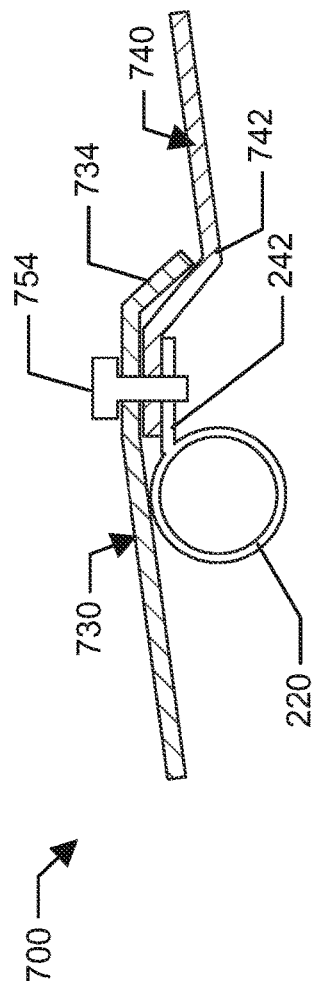
FIG. 7B is a cross-sectional view of the fourth example seam of FIG. 7A along a longitudinal line through a side mounting location.

FIG. 7B is a cross-section view along line B-B in the fourth example seam 700. The channel 742 and the wiper seal 734 may extend laterally the width of the seam 700. The front panel 730 and the rear panel 740 may be in surface contact at the line B-B and may be fastened with a fastener 754 (e.g., collar and screw).

FIG. 8 is a cross-sectional view along line A-A in a fifth example seam 800. The seam 800 may include a first spacer flange 832 extending downward from the front panel 830 rearward of the second lateral member 220. The first spacer flange 832 may be fastened to the middle center mount 244 with a fastener 850 (e.g., clip nut and screw). The front panel 830 may include a second spacer flange 834 extending downward at a rearward edge of the front panel 830 to form a channel. The spacer flange 834 may include a upward projection 836 and bulb seal 838. The rear panel 840 may include a boss 842 rearward of the upward projection 836. A fastener 852 (e.g., a tapping screw) may fasten the spacer flange 834 to the boss 842. The rear panel 840 may also include a rear spacer flange 844 extending downward. The rear spacer flange 844 may be fastened to the rear center mount 250 via a fastener 854 (e.g., clip nut and screw).

FIG. 9 is a cross-sectional view along line A-A in a sixth example seam 900. The seam 900 may include a first spacer flange 932 extending downward from the front panel 930 rearward of the second lateral member 220. The first spacer flange 932 may be fastened to the middle center mount 244 with a fastener 950 (e.g., clip nut and screw). The front panel 930 may include a second spacer flange 934 extending downward at a rearward edge of the front panel 930 to form a channel. The spacer flange 934 may include a boss 936 that receives a fastener 952 (e.g., a tapping screw) through the rear panel 940. The spacer flange 934 may also include upward projection 938 and bulb seal 939 at a rear edge of the front panel 930. The rear panel 940 may also include a rear spacer flange 944 extending downward. The rear spacer flange 944 may be fastened to the rear center mount 250 via a fastener 954 (e.g., clip nut and screw).

FIG. 10 is a cross-sectional view along line A-A in a seventh example seam 1000. The seam 1000 may include a first spacer flange 1032 extending downward from the front panel 1030 rearward of the second lateral member 220. The first spacer flange 1032 may be fastened to the middle center mount 244 with a fastener 1050 (e.g., clip nut and screw). The front panel 1030 may include a second spacer flange 1034 extending downward at a rearward edge of the front panel 1030 to corm a channel. The second spacer flange 1034 may include a well nut 1036 that may receive a fastener 1054 (e.g., a screw). The spacer flange 1034 may also include an upward projection 1038 and bulb seal 1039 at a rear edge of the front panel 1030. The rear panel 940 may also include a rear spacer flange 944 extending downward. The rear spacer flange 1044 may be fastened to the rear center mount 250 via a fastener 1054 (e.g., clip nut and screw).

FIG. 11 is a cross-sectional view along line A-A in a eighth example seam 1100. The seam 1100 may include a first spacer flange 1132 extending downward from the front panel 1130 rearward of the second lateral member 220. The first spacer flange 1132 may be fastened to the middle center mount 244 with a fastener 1150 (e.g., clip nut and screw). The front panel 1130 may include a second spacer flange 1134 extending downward at a rearward edge of the front panel 1130 to form a channel. The spacer flange 1134 may include a upward projection 1136 and bulb seal 1138. The rear panel 1140 may include a lifter flange 1142 rearward of the upward projection 1136. A fastener 1152 (e.g., a clip nut and screw) may fasten the spacer flange 1134 to the lifter flange 1142. The rear panel 840 may also include a rear spacer flange 1144 extending downward. The rear spacer flange 1144 may be fastened to the rear center mount 250 via a fastener 1154 (e.g., clip nut and screw).

FIG. 12 is a cross-sectional view along line A-A in a ninth example seam 1200. The seam 1200 may include a first spacer flange 1232 extending downward from the front panel 1230 rearward of the second lateral member 220. The first spacer flange 1232 may be fastened to the middle center mount 244 with a fastener 1250 (e.g., clip nut and screw). The front panel 1230 may include a second spacer flange 1234 extending downward at a rearward edge of the front panel 1230 to form a channel. The spacer flange 1234 may include a upward projection 1236 and bulb seal 1238. The rear panel 1240 may include a lifter flange 1242 rearward of the upward projection 1236. A fastener 1252 (e.g., a clip nut and screw) may fasten the spacer flange 1234 to the lifter flange 1242. The spacer flange 1234 may also include a second upward projection 1239 rearward of the fastener 1252 that covers a clip nut portion of the fastener 1252. The rear panel 840 may also include a rear spacer flange 1244 extending downward. The rear spacer flange 1244 may be fastened to the rear center mount 250 via a fastener 1254 (e.g., clip nut and screw).

FIG. 13A is a cross-sectional view along line A-A in a tenth example seam 1300. The seam 1300 may include a spacer flange 1332 extending downward from the front panel 1330 and a spacer flange 1346 extending downward from a front edge of the rear panel 1340. The spacer flange 1346 may form a channel. The spacer flange 1332 and the spacer flange 1346 may be fastened to the middle center mount 244 with a fastener 1350 (e.g., clip nut and screw). The front panel 1330 may include a downward projection 1334 having a bulb seal 1336 rearward of the middle center mount 244. The bulb seal 1336 may contact the spacer flange 1346. The rear panel 1340 may also include a rear spacer flange 1344 extending downward. The rear spacer flange 1344 may be fastened to the rear center mount 250 via a fastener 1352 (e.g., clip nut and screw).

FIG. 13B is a cross-sectional view along line C-C in a tenth example seam 1300. The downward projection 1334 and the bulb seal 1336 may extend laterally the width of the seam 1300. The front panel 1330 and the rear panel 1340 may be fastened with a fastener 1354 (e.g., clip nut and screw) at the line C-C without another connection to the lateral member 220. The spacer flange 1346 may include an upward projection 1348 covering the clip nut portion of the fastener 1354.

FIG. 14A is a cross-sectional view along line A-A in a eleventh example seam 1400. The seam 1400 may include a spacer flange 1432 extending downward from the front panel 1430 and a spacer flange 1446 extending downward from the rear panel 1440. The spacer flange 1446 may form a channel. The spacer flange 1432 and the spacer flange 1446 may be fastened to the middle center mount 244 with a fastener 1450 (e.g., clip nut and screw). The rear panel 1440 may include an upward projection 1447 having a bulb seal 1449 rearward of the fastener 1450. The bulb seal 1449 may contact a bottom surface of the front panel 1430. The rear panel 1440 may also include a rear spacer flange 1444 extending downward. The rear spacer flange 1444 may be fastened to the rear center mount 250 via a fastener 1452 (e.g., clip nut and screw).

FIG. 14B is a cross-sectional view along line C-C in a eleventh example seam 1400. The upward projection 1447 and the bulb seal 1449 may extend laterally the width of the seam 1400. The front panel 1430 and the rear panel 1440 may be fastened with a fastener 1454 (e.g., clip nut and screw) at the line C-C without another connection to the lateral member 220. The spacer flange 1446 may include an upward projection 1448 covering the clip nut portion of the fastener 1454.

FIG. 15A is a cross-sectional view along line A-A in a twelfth example seam 1500. The seam 1500 may include a spacer flange 1532 extending downward from the front panel 1530 and a spacer flange 1546 extending downward from the rear panel 1540. The spacer flange 1546 may form a channel. The spacer flange 1532 and the spacer flange 1546 may be fastened to the middle center mount 244 with a fastener 1550 (e.g., clip nut and screw). The rear panel 1540 may include an upward projection 1547 rearward of the fastener 1550. The rear panel 1540 may also include a rear spacer flange 1544 extending downward. The rear spacer flange 1544 may be fastened to the rear center mount 250 via a fastener 1552 (e.g., clip nut and screw).

FIG. 15B is a cross-sectional view along line C-C in a twelfth example seam 1500. The upward projection 1547 may extend laterally the width of the seam 1500. The front panel 1530 and the rear panel 1540 may be fastened with a fastener 1554 (e.g., clip nut and screw) at the line C-C without another connection to the lateral member 220. The spacer flange 1546 may include an upward projection 1548 covering the clip nut portion of the fastener 1554.

Figure 16:
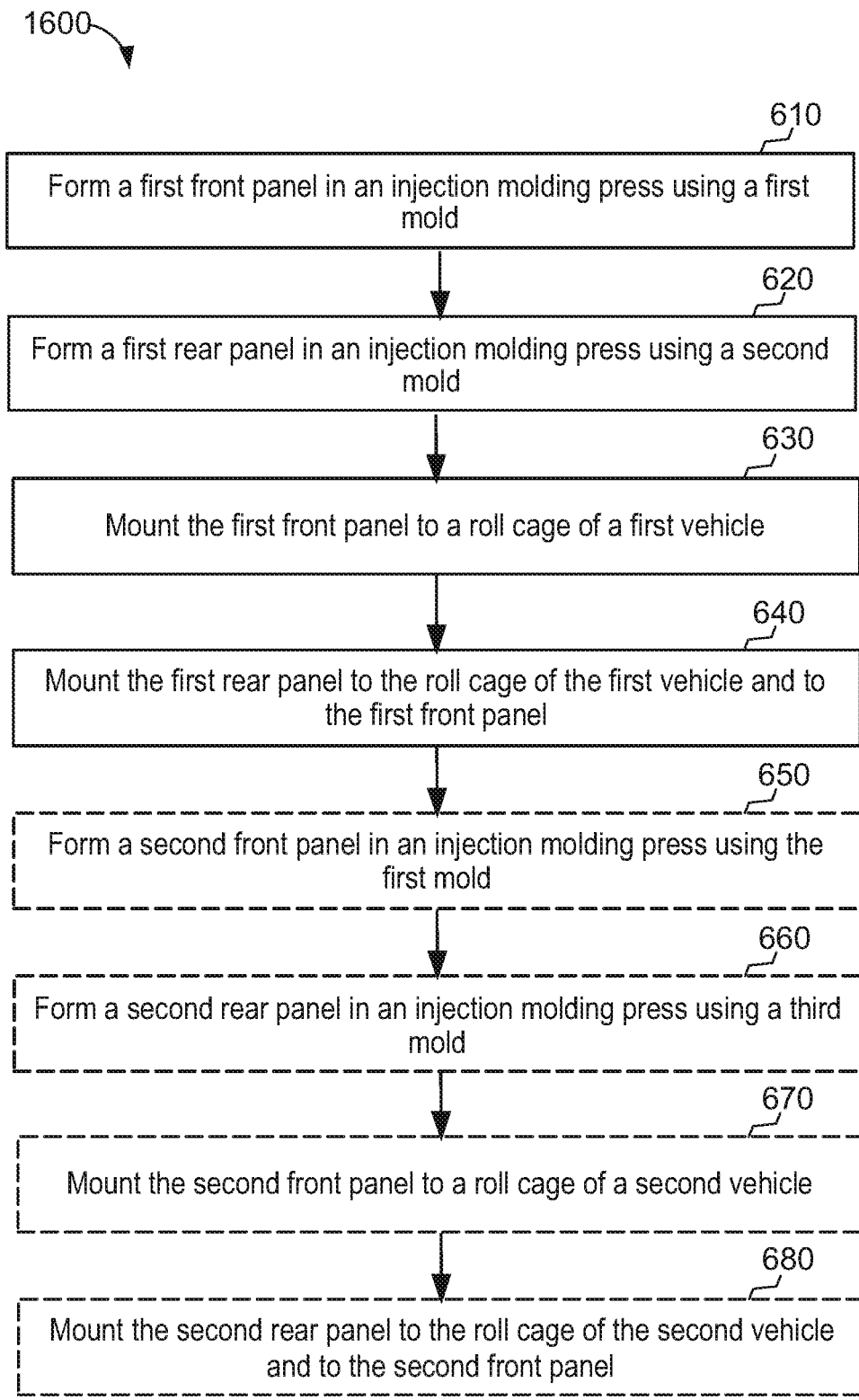
FIG. 16 is a flowchart of an example method for manufacturing roofs for off-road vehicles.

FIG. 16 is a flowchart illustrating an example method 1600 of manufacturing roofs for off-road vehicles. The vehicle roofs may be any of the roof structures 100, 200, 300. The method 1600 may be performed by an operator using equipment including an injection molding press and other manufacturing tools and apparatuses known in the art. It should be appreciated that the front panel 130 of the roof may be used on two or more models of vehicle, so panels for different vehicles may be formed using the same mold. Although the method 1600 is described below with respect to actions performed by an operator, one or more of the steps described herein may be automated (e.g., performed by a robotic arm).

In block 1610, the method 1600 may include forming a first front panel in an injection molding press using a first mold. In an aspect for example, the front panel 130 or 330 may be formed in an injection molding press using the first mold.

In block 1620, the method 1600 may include forming a first rear panel in an injection molding press using a second mold. In an aspect, for example, the rear panel 140 or the rear panel 240 may be formed in an injection molding press using the second mold.

In block 1630, the method 1600 may include mounting the first front panel to a roll cage of a first vehicle. For example, an operator may mount the front panel 130, 330 to the roll cage 110, 210.

In block 1640, the method 1600 may include mounting the first rear panel to the roll cage of the first vehicle and to the first front panel. In an aspect, for example, the operator may mount the rear panel 140, 240, 340 to the roll cage of the first vehicle and to the first front panel 130, 330.

In block 1650, the method 1600 may optionally include forming a second front panel in an injection molding press using the first mold. In an aspect, for example, the second front panel may be a copy of the first front panel, that is, front panel 130, 330.

In block 1660, the method 1600 may include forming a second rear panel in an injection molding press using a third mold. In an aspect, for example, the second rear panel may be different than the first rear panel. For example, when the first rear panel is rear panel 140, the second rear panel may be rear panel 240.

In block 1670, the method 1600 may include mounting the second front panel to a roll cage of the second vehicle. In an aspect, for example, the second vehicle may be different than the first vehicle. For example, if the first vehicle is a two-seat model, the second vehicle may be a four-seat model.

In block 1680, the method 1600 may include mounting the second rear panel to the roll cage of the second vehicle and to the second front panel. In an aspect, for example, the second rear panel may mate with the second front panel in the same manner as the first rear panel mates with the first front panel. The second rear panel, however, may have a different length than the first rear panel. The second rear panel, for example, rear panel 240 may additionally mount to the third lateral member 226. Conversely, if the second rear panel is the rear panel 140, the second rear panel may mount only to the front panel 130 and to the second lateral member.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A roofing system for vehicles, comprising:
   a front panel that connects to a front, first lateral member of a roll cage of the vehicle and extends rearward over a front passenger seat to a rearward, second lateral member of the roll cage; and
   a rear panel that overlaps and connects to the front panel at a lateral seam including a channel formed in one of the front panel and the rear panel and a seal between the front panel and the rear panel, wherein the front panel and rear panel are coupled to the rearward, second lateral member via a fastener rearward of the lateral seam.

2. The roofing system of claim 1, wherein the rear panel extends over a second row passenger seat and connects to a third lateral member of the roll cage.

3. The roofing system of claim 2, wherein the rear panel extends in a triangular shape past the third lateral member.

4. The roofing system of claim 1, wherein the rear panel extends in a triangular shape past the second lateral member.

5. The roofing system of claim 4, wherein the rear panel includes at least two openings behind the second lateral member.

6. The roofing system of claim 1, wherein the channel is formed in the front panel, the rear panel is coupled to the front panel via a fastener through the channel, and the seal is an upward facing seal extending from a top surface of the front panel to a bottom surface of the rear panel.

7. The roofing system of claim 6, wherein the seal is located rearward of the fastener.

8. The roofing system of claim 7, further comprising a second seal located at a front edge of the rear panel and contacting a surface of the channel.

9. The roofing system of claim 6, wherein the seal is located in the channel forward of the fastener.

10. The roofing system of claim 5, wherein the channel is located along a forward edge of the rear panel and the seal is a wiper seal located along a rear edge of the front panel that contacts a top surface of the channel.

11. The roofing system of claim 5, wherein the channel is formed by a downward extending spacer flange along a rear edge of the front panel, the front panel and rear panel are coupled via a fastener within the channel in one of the panels, and the seal extends upward from the channel to contact a bottom surface of the rear panel.

12. The roofing system of claim 11, wherein the fastener includes one or more of: a boss formed in one of the panels, a clip nut, a well nut, a screw, and a bolt.

13. The roofing system of claim 1, wherein the channel is formed by a flange along a front edge of the rear panel.

14. The roofing system of claim 13, wherein the seal extends downward from a front edge of the rear panel to contact the channel.

15. The roofing system of claim 13, wherein the seal extends upward from the channel to contact a bottom surface of the rear panel.

16. A method of manufacturing roofs for vehicles, comprising:
    forming a first front panel in an injection molding press using a first mold;
    forming a first rear panel in an injection molding press using a second mold;
    mounting the first front panel to a roll cage of a first vehicle, wherein the first front panel connects to a front, first lateral member of the roll cage and extends rearward over a front passenger seat to a rearward, second lateral member of the roll cage;
    mounting the first rear panel to the roll cage of the first vehicle and to the first front panel, wherein the first rear panel overlaps and connects to the first front panel at a lateral seam including a channel formed in one of the front panel and the rear panel and a seal between the first front panel and the first rear panel, wherein the front panel and rear panel are coupled to the rearward, second lateral member via a fastener rearward of the lateral seam.

17. The method of claim 16, further comprising
    forming a second front panel in an injection molding press using the first mold;
    forming a second rear panel in an injection molding press using a third mold;
    mounting the second front panel to a roll cage of a second vehicle;
    mounting the second rear panel to the roll cage of the second vehicle and to the second front panel, wherein the second rear panel overlaps and connects to the second front panel at a lateral joint including a channel and a seal between the second front panel and the second rear panel.

18. The method of claim 16, wherein the first vehicle comprises two side by side seats and the second vehicle comprises four seats arranged in two rows.

19. An off-road vehicle, comprising:
    a seating area including at least two seats;
    a roll cage extending over the at least two seats;
    a front panel that connects to a first front lateral member of the roll cage and extends rearward over the at least two seats to a second lateral member of the roll cage; and
    a rear panel that overlaps and connects to the front panel at a lateral joint including a channel formed in one of the front panel and the rear panel and a seal between the front panel and the rear panel, wherein the channel is formed in the front panel, the rear panel is coupled to the front panel via a fastener through the channel, and the seal is an upward facing seal extending from a top surface of the front panel to a bottom surface of the rear panel.

* * * * *